United States Patent [19]
Waite et al.

[11] 4,083,474
[45] Apr. 11, 1978

[54] APPLICATOR GUN FOR MULTI-COMPONENT RESIN SYSTEMS

[75] Inventors: Mearle J. Waite; Frank Wislocker, both of Longview, Wash.

[73] Assignee: Weyerhaeuser Company, Tacoma, Wash.

[21] Appl. No.: 779,448

[22] Filed: Mar. 21, 1977

[51] Int. Cl.$^2$ ............................................. B67D 5/56
[52] U.S. Cl. .................................. 222/145; 137/114; 222/474; 222/571; 239/112; 239/527
[58] Field of Search .................... 272/108.4, 132, 134, 272/135, 145, 148, 484.5, 488, 491, 506, 509, 556, 557, 571, 472–474; 239/75, 112, 414, 527; 137/98, 114, 607

[56] References Cited
U.S. PATENT DOCUMENTS

| | | | |
|---|---|---|---|
| 2,550,888 | 5/1951 | Traughber | 239/414 X |
| 3,144,967 | 8/1964 | McClain | 222/485 X |
| 3,330,484 | 7/1967 | Johnson et al. | 239/114 |
| 3,369,566 | 2/1968 | Schmitt et al. | 137/607 X |
| 3,486,662 | 12/1969 | Peryr et al. | 222/134 |

Primary Examiner—Robert B. Reeves
Assistant Examiner—Fred A. Silverberg

[57] ABSTRACT

An easily cleaned trigger-actuated gun of simplified construction for applying a multi-component resinous patching or adhesive compound system to a workpiece is described. An internal valve positioner, connected to the trigger mechanism by means of an operating rod, regulates flow of compound from the gun, between zero, intermediate or full flow rates in response to trigger position, by adjusting clearances between simple flow checking ball elements and their valve seats at each component inlet into the gun. The metered components flow through a static mixer tube, onto the workpiece. A dripless feature is provided by the addition of a cylinder component that remains present in the valve chamber of the gun during operation but withdraws from the chamber after compound flow from the gun is halted, in response to the same release of trigger that shuts off component flow, causing a slight vacuum in the gun sufficient to pull back into the discharge end of the gun the last drop of adhesive not adhering to the workpiece.

6 Claims, 6 Drawing Figures

APPLICATOR GUN FOR MULTI-COMPONENT RESIN SYSTEMS

BACKGROUND OF THE INVENTION

This invention relates to trigger-actuated applicators for multi-component adhesives or fillers of the resin type or the like. More particularly, the invention relates to internal valving control mechanisms of gun applicators that meter the flow of a multi-component compound onto a workpiece in response to operator demand.

Gun-type applicators are useful where materials are applied to a workpiece intermittently by an operator who must exercise judgement as to amount and placement of material. For example, in manufacturing plywood, an adhesive filler is applied to random defects such as knotholes and cracks in the outer plies of panels which may have a subsequent overlayment.

The materials applied by a gun may comprise fluids having a wide range of physical characteristics such as viscosity, densities, and the like. Often the material applied is a mixture or a reaction product of several components. For example, in the plywood manufacturing process indicated above, a commonly used filler-patching compound is a urethane system, produced by mixing tolylene di-isocyanate with a glycol or other hydroxylic component. The two liquid components require vigorous stirring, with a polymerization reaction taking place in emulsion at very high rates. The typical compounds used for patching and filling are designed to be fast curing on the workpiece, which design requirement results in the compound generally having a very low pot life.

As a consequence of system application requirements such as fast cure time, the major drawback in the use of guns heretofore known has been their general propensity to foul and plug with compound that has set or partially cured. These drawbacks are magnified by intermittent use and low flow rates through the apparatus which are characteristic of the patching and filling use previously described.

The known gun cleaning techniques require solvent flushes and disassembly on a regular basis. Solvent cleaning is generally not enough since the gun interiors are often complex, presenting many surface areas for accumulation of partially cured compound. The solvent flushing technique employed to clean most guns often involves backflow into component supply lines which must be purged with fresh component material when the gun is placed back in use resulting in waste of component material and the creation of a disposal problem.

It is also desirable that a gun be operable without waste or loss of compound through leakage and dripping from the discharge end of the gun. Such dripping is not only an economic loss but creates production difficulties as the compound fouls the workpiece and work station.

SUMMARY OF THE INVENTION

The inventive gun is capable of delivering a quick-curing multi-component compound of limited pot life to a workpiece at intermittent, low-flow rates metered onto the workpiece in response to operation of a trigger mechanism. The gun comprises a body, enclosing a metering chamber, apertured to provide inlets for each component of a compound into the chamber; a valve means in each inlet having flow control elements, assessable from the metering chamber, for regulating flow of each component into the chamber; an operating rod-valve positioner means, in contact with each valve means flow control element, for varying the valve discharge openings into the chamber from zero flow full flow; and, a trigger mechanism attached externally to the gun body and connected to the operating rod wherein depression of the trigger moves the rod means from a trigger-biased closed or zero flow position to an open position, ranging from low flow to full flow, depending upon the degree of trigger depression.

An anti-drip feature of the gun is provided by an additional element that in conjunction with trigger operation is present in the mixing chamber during gun discharge but upon release of the trigger, after component flows cease, withdraws from the chamber, thereby creating a vacuum within the chamber sufficient to draw the last portion of compound not discharged from the tip of the gun back into the gun.

Further, this invention provides a simplified applicator gun, for applying multi-component resin-type compounds to the workpiece, designed to minimize downtime caused by plugging of the mechanism, yet capable of delivering intermittent, low flows of compound onto a workpiece in response to movement of a trigger positioned by an operator observing the workpiece demands for the compound. It is an object of this invention to provide an internal valving mechanism to adjust the flow rate of components into a mixing chamber which design is of such simplicity that it may be readily cleaned by washout with a solvent material without backflow of solvent into component supply lines. It is a further object of this invention to provide a gun of such simple construction that disassembly for cleaning may be easily accomplished.

DESCRIPTION OF THE PREFERRED EMBODIMENTS

Figure 1:
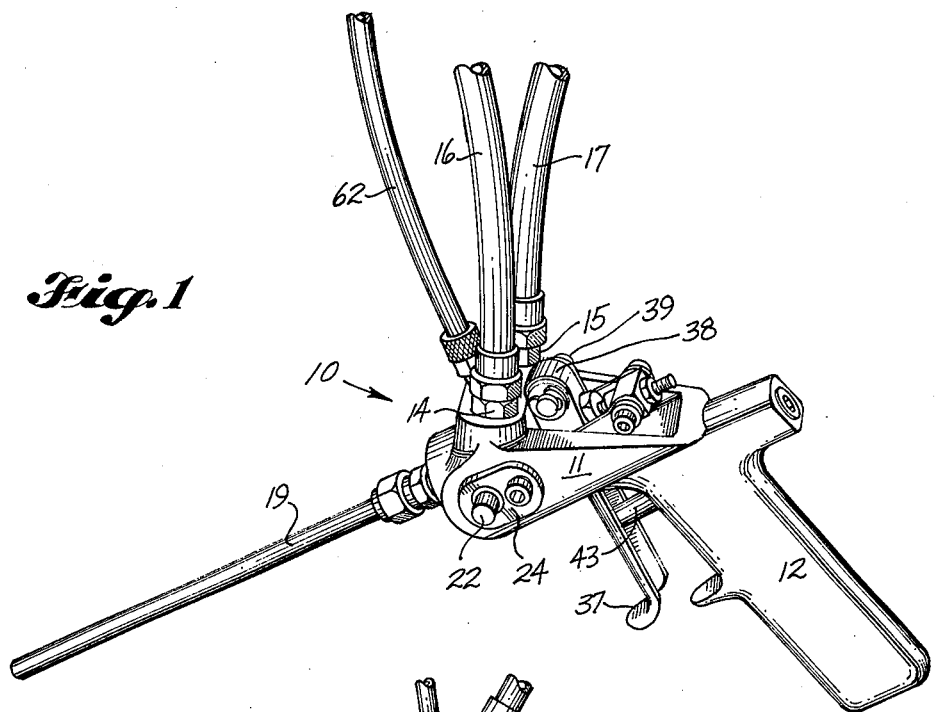
FIG. 1 shows an isometric projection of the assembled applicator gun of this invention.
Figure 2:
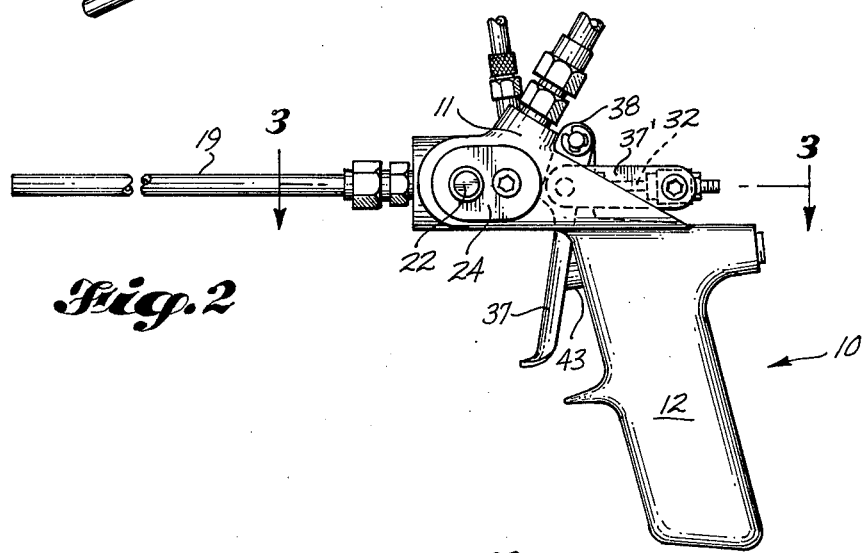
FIG. 2 shows an elevation view of the FIG. 1 applicator gun.
Figure 3:
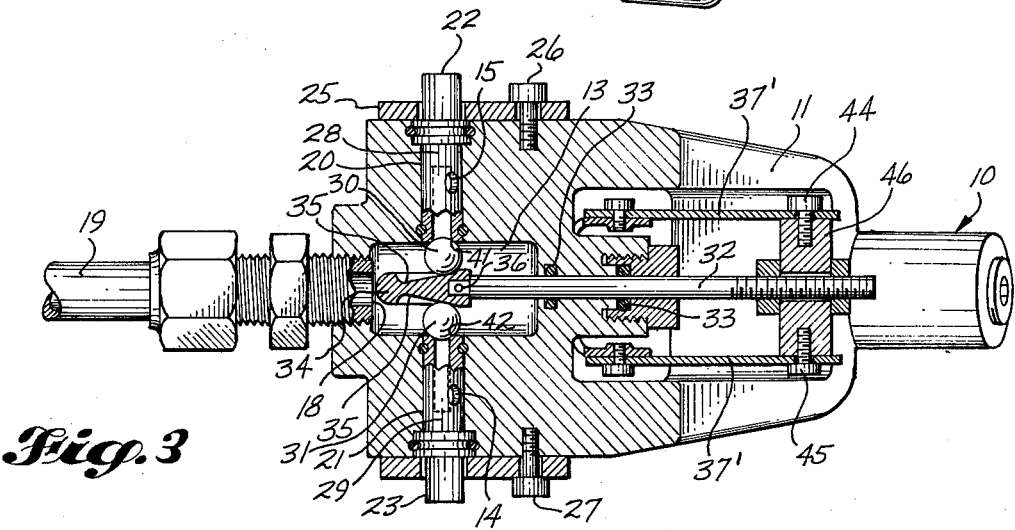
FIG. 3 shows a sectional plan view along lines 3—3 of the metering chamber/ball valve element arrangement of the inventive applicator gun.

Referring to FIGS. 1–3, a preferred embodiment of the inventive multi-component applicator gun 10 is depicted. A gun body 11, having a pistol-style grip 12, encloses a metering chamber 13 having multiple inlet openings 14, 15 for receiving the individual component materials that make up the applied compound through lines 16, 17. A storage, pumping, and proportionator system supplies the components at appropriate pressure and in the proper proportions to the gun. This system, not part of the invention, it not shown. A discharge port 18 is fitted with a mixing device 19 which may be of the static type or some other device capable of mixing the component materials to the necessary degree. The gun body 11 is further apertured, into metering chamber 13, by openings 20, 21 into which ball valve mechanisms 22, 23 are positioned, held in the body openings by valve caps 24, 25 secured to the body by cap screws 26, 27. The ball valve mechanisms 22, 23 each comprise a cylinder 28, 29, bored and gasketed to direct passage of the fluid component through the valve to a discharge port 41, 42 and a flow checking element 30, 31 seated into the discharge port of the valve cylinder to control discharge of fluid therefrom. An operating rod 32 extends through the body, sealed by gaskets 33, into the valve chamber 13, and is free to move axially. A valve positioner 34, mounted on the metering chamber end of the operating rod 32, is in contact with each of the valve mechanism discharge ball check elements 30, 31. The positioner 34 is shaped to provide contact surfaces 35 such that, as the operating rod-positioner combination is moved axially, the clearances between the ball checks 30, 31 seated in valve seats 41, 42 and the portion of contact surface 35 opposite the valve seats vary between zero and a maximum which correspond to flow rates between zero and a maximum flow for which the gun is designed overall.

The valve positioner 34 is pivotally mounted upon operating rod 32 at pin 36 to permit the balls 30, 31 to seek a position with respect to their valve seats 41, 42 proportional to the viscosity and flow rate of the components flowing into the gun, as set by the component supply-pumping system (not shown) that regulates overall flow of the relative proportions of components into the gun.

The operating rod 32 is connected to a trigger assembly comprising a trigger piece 37 pivoted upon the body 11 at mounting tab 38 by pivot pin 39 and pinned through trigger link 37' by cap screws 44, 45 through trigger block 46 which is bolted onto the operating rod 32. A ferrule 43, containing a spring (not shown), biases the trigger away from the grip 12, in which position the operating rod and the valve positioner 34 has seated the ball checks 30, 31 against their valve seats 41, 42, blocking flow into the gun.

In operation, the component lines 16, 17 are supplied with individual or mixtures of components that make up a desired patching or filling compound of the resinous type. Initially, the trigger mechanism spring biases the operating rod forward so that the valve positioner forces the ball checks against their seats, blocking component flow into the gun. Depression of the trigger, against its spring biasing means, moves the operating rod-valve positioner axially rearward, in the same direction as the trigger pull. As the rod-valve positioner moves rearward, the contact surfaces 35 of the valve positioner gradually allows clearance between the valve seats 41, 42 and the ball check 30, 31, permitting flow of pressurized components into the metering chamber 13 and thence through the mixing tube 19 onto a workpiece. Flow continues through the gun as long as the trigger is depressed. The rate of flow through the gun between zero flow and maximum flow is dependent upon the axial position of valve positioner 34, controlled by operation of the trigger mechanism. The dimensions between the valve positioner surface 35, valve seats 41, 42, and the diameter of the ball checks 30, 31 must be adjusted so that the ball checks are confined within machined track 35 within the range of operator rod movement.

Figure 4:
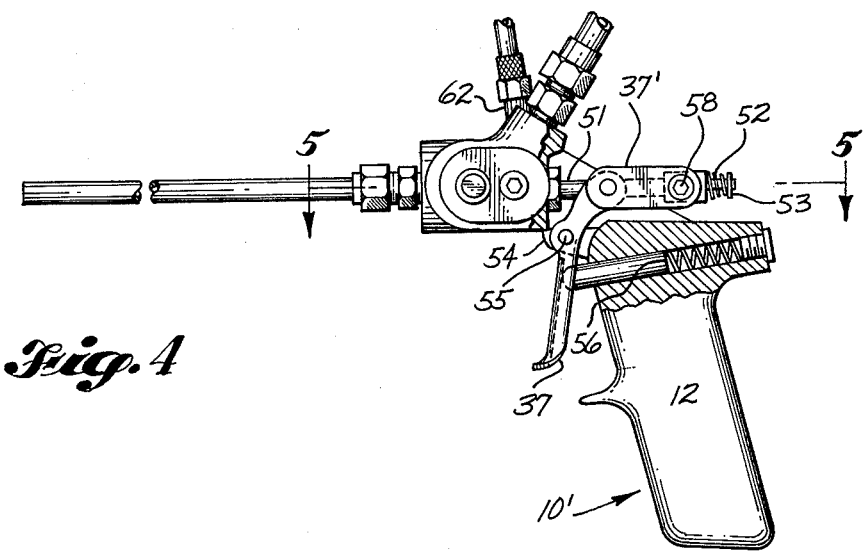
FIG. 4 is an elevational view of another embodiment of the inventive applicator gun, including a dripless feature.
Figure 5:
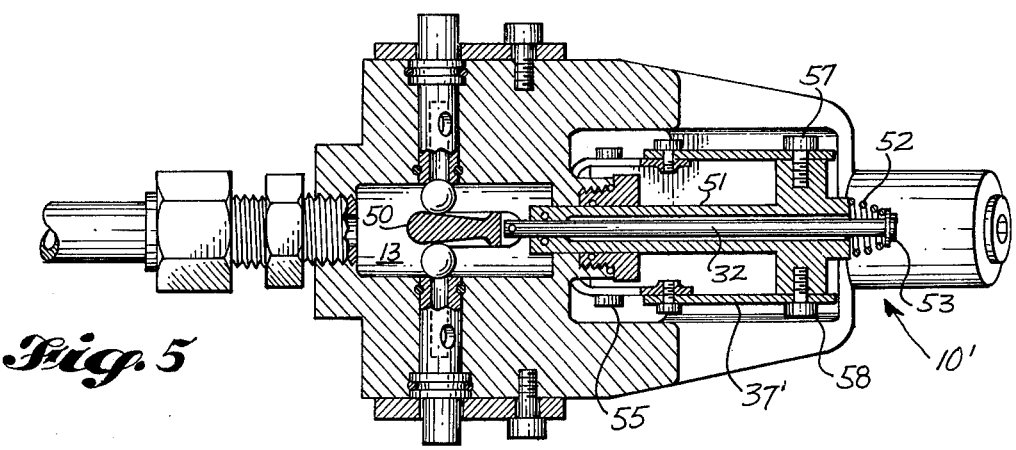
FIG. 5 is a sectional plan view of FIG. 4 along lines 5—5 showing the metering chamber/ball valve element arrangement and dripless element details.
Figure 6:
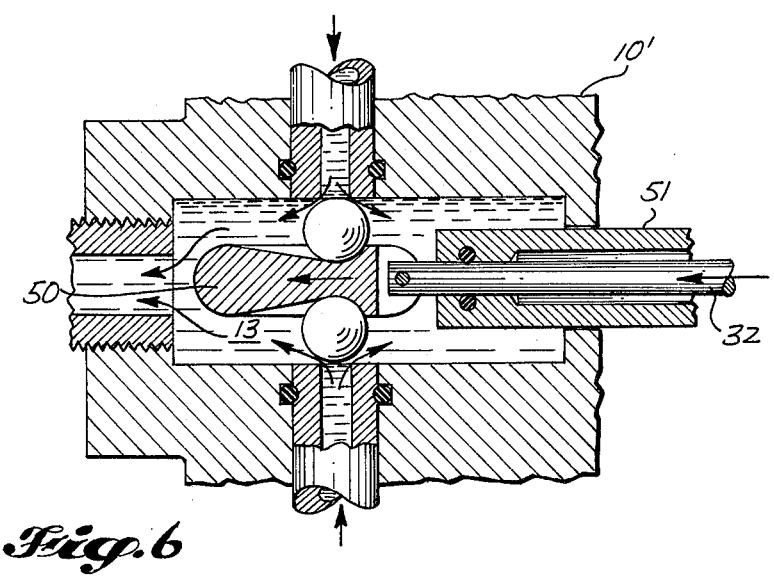
FIG. 6 is an enlarged detail view of the ball valve mechanism of the inventive applicator gun, including the dripless element.

Referring now to FIGS. 4–6, a dripless embodiment of the inventive gun applicator is shown whereby additional elements cause, upon trigger release, the last drop of compound discharged from the gun that does not adhere to the workpiece to be pulled back into the gun rather than later dripping inadvertently onto an undesirable location. The gun is basically as previously described but modified by addition of the anti-drip mechanism.

In the anti-drip embodiment 10', the valve positioner 50 is arranged, reversed with respect to the previously described embodiment 10, so that movement of operating rod 32 axially forward permits flow into the metering chamber 13, proportional to rod position, at any rate between zero flow and the full flow for which the gun is designed. The operating rod is attached to the valve positioner and the trigger mechanism generally in the same manner as before; that is, free to move axially, in response to trigger actuation. The anti-drip feature of the gun is provided by an anti-drip mechanism comprising a gasketed, hollow cylinder 51 of appreciable diameter and volume with respect to metering chamber 13 volume; and a spring 52, compressed between cylinder 51 and a securing nut 53, both mounted on the operating rod 32. The anti-drip element 51 is free to move axially with respect to the operating rod 32, and axially in and out of the metering chamber 13. The trigger mechanism 37 is attached through trigger link 37' at cap screws 57, 58 to the cylinder 51 and is pivotally attached to the body 11 at a mounting tab 54, located below the operating rod 32, by a pin 55 such that depression of the trigger 37, towards grip 12, causes the operating rod to move forward, while release of the trigger causes the operating rod to move away from the grip 12 in response to a trigger biasing spring 56. The dimensions of the various parts are adjusted so that the valve positioner 50 allows no flow through the gun when the trigger 37 is at the undepressed, at rest, position and full flow of material from the gun when the trigger is fully depressed against grip 12.

The operation of the gun incorporating the anti-drip feature will now be described. At zero flow from the gun, valve positioner 50 seals off flow of components into the gun, as previously described, held into position by operating rod 32 in cooperation with cylinder 51. Cylinder 51 is in its rearmost position with spring 52 collapsed under compression in response to the stronger trigger spring 56, which biases the trigger 37.

Depression of the trigger 37 causes the cylinder 51 to move forward entering chamber 13. Spring 52 relaxes slightly as the cylinder moves relative to operating rod 32 until the cylinder abuts valve positioner 50. Further depression of the trigger moves the cylinder-valve positioner combination forward, permitting flow of components into the gun, as previously described and indicated in FIG. 6.

When the trigger 37 is completely released to halt flow from the gun, the cylinder-operating rod-valve positioner combination moves axially rearward, the valve positioner shutting off flow of components into, and the cylinder withdrawing from, the metering chamber. Eventually the valve positioner-operating rod is in its rearmost position with flow to the gun completely shut off and cylinder 51 extending into the metering chamber only the distance allowed by the relaxation of spring 52 when flow was initially begun. Finally, with flow shut off, the trigger spring 56 overcomes spring 52 completing the extraction of cylinder 51 so that it is flush with the rear wall of the mixing chamber. The extraction of cylinder 51, with flow into the gun shut off, causes a sufficient vacuum within the gun so that the last small drop at the discharge of the gun will be pulled back into the discharge nozzle, preventing it from dripping.

Both embodiments of the applicator gun are provided with a separate inlet 62 into metering chamber 13 for supplying solvent for cleaning the gun without major disassembly. Since the component flow valves are located within the gun cavity, solvent flushing will clean the valves right up to their seats, reducing maintenance considerably. Surfaces in the metering chamber are minimized in complexity to reduce accumulation of solids during short-term zero or low flow conditions. All valving and the antidrip cylinder are designed to form a level metering chamber walls. The flow valves themselves may be easily removed from the gun by removing the cap screws and valve caps holding them in place.

The contact surfaces of the valve positioner are cut, in elevation, slopped to vary contact surface-valve flow element clearances between zero and a maximum that corresponds to an "off" to "full" flow range of compound. The included angle of the contact surfaces is usually cut to around 10° to 15°. Other modifications of the gun and operating mechanism may be necessary to adjust for the physical or chemical characteristics of various components in compounds to be applied using the applicator.

The ability of the valve positioner to pivot on the end of the operating rod adds great flexibility to operation of the gun. Thus, the gun is self-adjusting when variations in viscosity and flow rates occur caused by changes in ambient conditions. The gun will operate properly even when compound formulation changes must be made without major part modification.

What is claimed is:

1. An applicator gun for supplying a multi-component compound to a workpiece, comprising;
   a body, enclosing a metering chamber, apertured to provide inlets into said chamber for each component of the multi-component compound;
   valve means in each inlet for regulating flow of each component into said chamber, each valve having a flow control element, accessible from inside said chamber;
   a valve positioner in contact simultaneously with all flow control elements, having contact surfaces such that movement of said positioner axially with respect to the gun body permits the flow control elements to move from substantially zero flow to full flow positions;
   an operating rod means for allowing external adjustment of said valve positioner, connected to said valve positioner, extending from said metering chamber, slidably mounted in the gun body and free to move axially with respect to the gun body; and
   a trigger means mounted on said body and linked to said operating rod means such that full movement of said trigger operates to move said valve positioner between zero flow and full flow positions.

2. The applicator gun of claim 1, wherein:
   said valve positioner is pivotally connected to the operating rod means, permitting adjustment between contact surfaces and flow control elements in response to component viscosity and flow rate variations.

3. The applicator gun of claim 1, wherein:
   the multi-component compound is a two-component urethane system.

4. The applicator gun of claim 1, wherein said valve means, comprises:
   a valve cylinder, mounted in the gun body, apertured to direct component flow into said body metering chamber, and
   said flow control element in the form of a ball, seated in said discharge port for regulating flow of component through said valve means.

5. The applicator gun of claim 1, wherein the valve positioner contact surfaces for controlling flow through the valve means by contacting said valve flow control elements are shaped, in longitudinal section with respect to the gun, in the form of a sloped plane having an included angle of about 10°–15°, of such length that axial movement of the valve positioner in response to trigger operation varies flow control element clearances between the control surfaces and discharge port seats permitting flow through the valve means ranging between zero flow and a maximum flow of compound from the gun.

6. The applicator gun of claim 1, including means for dripless operation of said gun, comprising:
   an anti-drip cylinder, mounted concentrically with respect to said operating rod, free to move axially into the metering chamber, connected to said trigger mechanism; and
   a retracting spring, mounted concentrically with respect to and fastened to the end of said operating rod, abutting said cylinder,
   wherein, in cooperation with the trigger mechanism, said cylinder is extended into said metering chamber during flow of compound from the gun but after said flow is halted by release of said trigger mechanism, the cylinder withdraws from the metering chamber as the trigger mechanism overcomes said retracting spring causing a sufficient vacuum to be generated within the gun to pull the last drop of compound, discharge from the gun without adhering to the workpiece, back into said gun.

* * * * *